Dec. 13, 1960      L. M. GREENE      2,964,744
WARNING SIGNAL FOR AIRCRAFT
Filed April 26, 1957      2 Sheets-Sheet 1
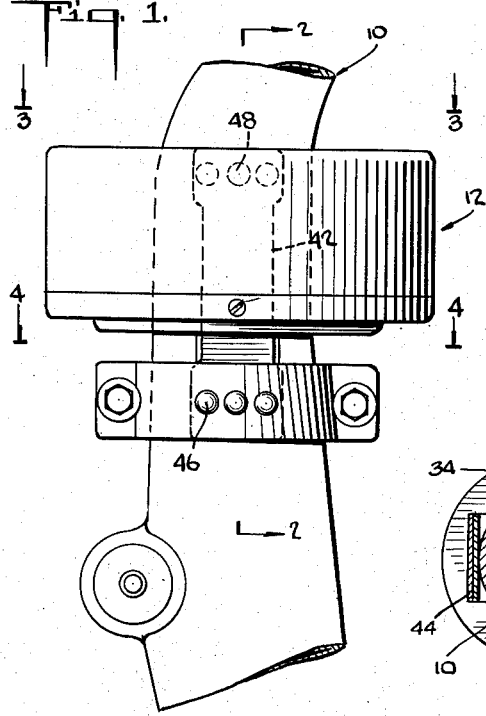
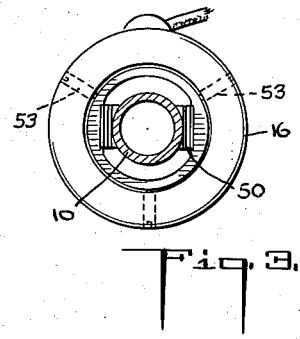
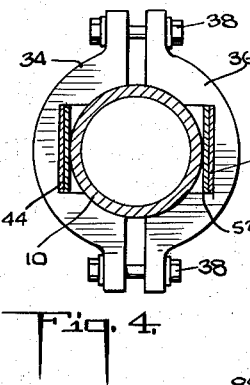
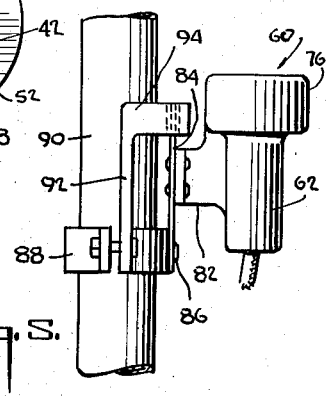
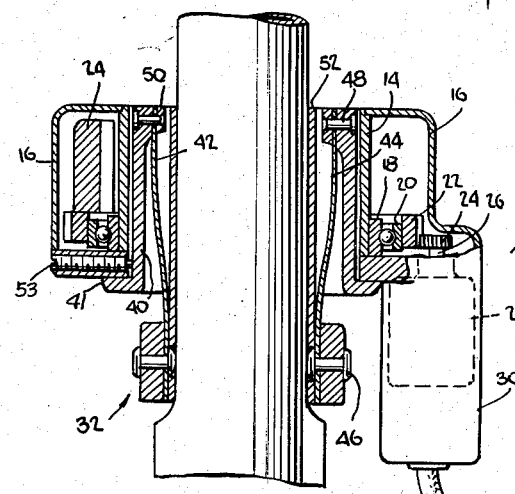
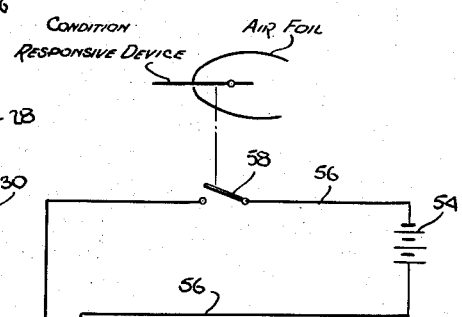
INVENTOR.
LEONARD M. GREENE
BY
ATTORNEYS

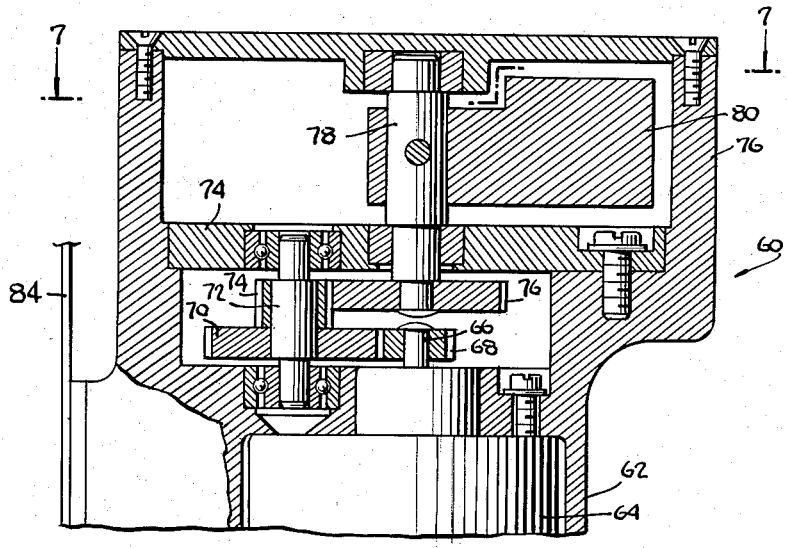
Fig. 6.
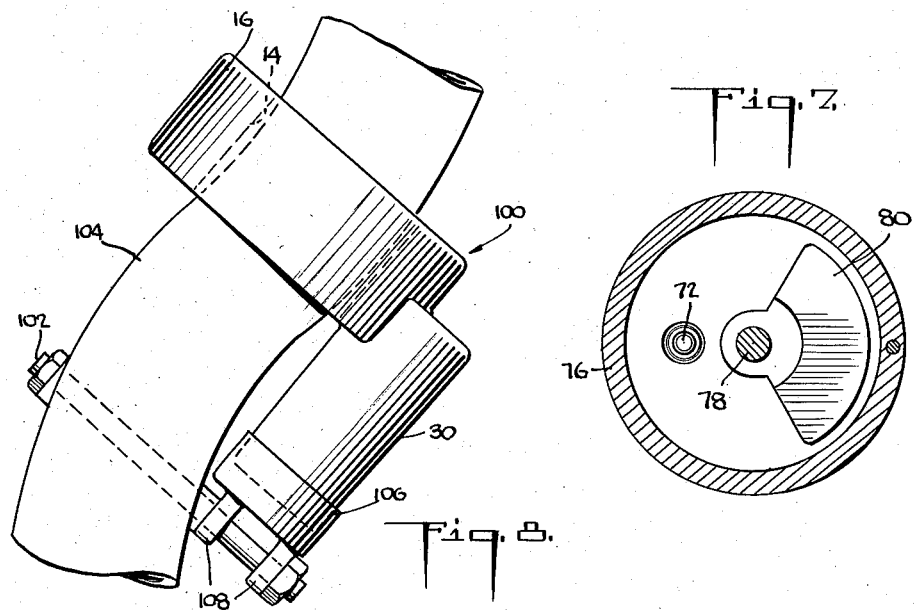
Fig. 7.
Fig. 8.
INVENTOR.
LEONARD M. GREENE
BY
ATTORNEYS United States Patent Office 2,964,744
Patented Dec. 13, 1960

2,964,744

WARNING SIGNAL FOR AIRCRAFT

Leonard M. Greene, Scarsdale, N.Y., assignor to Safe Flight Instrument Corporation, White Plains, N.Y., a corporation of New York Filed Apr. 26, 1957, Ser. No. 655,345

5 Claims. (Cl. 340—407)

This invention relates to a warning signal for aircraft. More particularly, my invention is an improvement on the vibratory aircraft alarm of the rotary eccentric type shown, described and claimed in my United States Letters Patent No. 2,566,409, issued on September 4, 1951.

A device of the type shown in my aforesaid patent was employed to set up a vibrating alarm and found its principal use on the control stick of an airplane. In this position when it was actuated responsive to certain conditions of imminent danger it induced an artificial buffeting of the control stick and thereby restored to an airplane the warning which less stable airplanes previously had given upon the approach of such conditions.

However, in more modern aircraft, flying at high speed, e.g. in the transonic and supersonic ranges, aerodynamic buffeting is experienced which has no relation to the approach of a dangerous condition such, for instance, as stall. Even when the speed of the aircraft falls off on the way to stall, the buffeting still may continue. Under these circumstances, a vibratory alarm of the type shown in my issued patent cannot be relied upon as a sufficient warning signal.

It is an object of my present invention to provide an improved alarm which is not subject to the foregoing drawback.

It is another object of my invention to provide an aircraft alarm of the character described which will provide a signal more readily perceptible to the sense of touch than a simple vibratory signal.

Another object of my invention is to provide an aircraft alarm of the character described which produces a series of sharp blows or raps which constitutes a sensory warning quite distinct from and which cannot be confused with the natural control buffeting such as may be experienced in normal flight at transonic or supersonic speeds.

Other objects of my invention in part will be obvious and in part will be pointed out hereinafter.

My invention accordingly consists in the features of construction, combinations of elements and arrangements of parts which will be exemplified in the devices hereinafter described and of which the scope of application will be indicated in the appended claims.

In the accompanying drawings, in which are shown various possible embodiments of my invention, Fig. 1 is a side view of the control stick of an airplane having mounted thereon an alarm constructed in accordance with the instant invention;

Fig. 2 is a sectional view taken substantially along the line 2—2 of Fig. 1 and showing in connection therewith a typical circuit for actuating the alarm;

Figs. 3 and 4 are reduced cross-sectional views taken substantially along the lines 3—3 and 4—4, respectively, of Fig. 1;

Fig. 5 is a view similar to Fig. 1, but on a smaller scale, of a device embodying a modified form of my invention;

Fig. 6 is an enlarged vertical sectional view through the device shown in Fig. 5;

Fig. 7 is a reduced sectional view taken substantially along the line 7—7 of Fig. 6; and Fig. 8 is a view similar to Fig. 1 of an aircraft alarm embodying another modified form of my invention.

In general I carry out my invention by providing a rotary eccentric weight mounted and actuated for spinning about an axis of rotation whereby under ordinary conditions, if the axis were affixed to some object rigidly, the object would be shaken. To partially convert the buffeting sensation which normally would be produced into one of distinct sharp raps or blows, I provide a special mounting mechanism for connecting the eccentric rotating weight to the object. This mounting mechanism is of a singular construction such as to permit limited relative movement between the axis of rotation of the weight and the object in a direction generally transverse to said axis. Thereby, as the weight is rotated, it will travel first one way and then in the opposite way, both of these ways intersecting the object so as to create a rapid series of sharp blows which cannot be confused with the buffeting that takes place during high speed flight of an airplane.

Referring now in detail to the drawings and more particularly to Figs. 1 through 4, the reference numeral 10 denotes a standard control column of an airplane, and the reference numeral 12, the aircraft alarm constructed in accordance with my invention. Said alarm includes a tubular sleeve 14 considerably larger than the control column and forming the inner wall of a toroidal casing 16. The lower end of the sleeve has securely mounted thereon an internal race 18 of an anti-friction bearing, e.g. a ball bearing, the outer race 20 of which is therefore free to rotate about the central longitudinal axis of the sleeve. Said outer race has fastened firmly thereto a ring gear 22. The ring gear securely mounts an eccentric weight 24, i.e. a weight which spans considerably less than the full 360° of said gear. Desirably the weight comprises a concentrated mass of metal in sector-like form.

The ring gear 22 meshes with a pinion 24 that is fastened to the output shaft 26 of an electrical motor 28 that is housed in a casing 30 pendent from the toroidal casing 16. It will be quite obvious, particularly after a reading of my said Letters Patent No. 2,566,409, that if the device as thus far described were secured rigidly on a control column of an airplane, actuation of the motor 28 would shake said column so as to create an artificial buffeting thereof. However, in accordance with the instant invention, the device is not thus mounted. To partially convert the buffeting action to one which creates a succession of sharp distinct raps, I provide for said eccentric rotating device a mounting 32 which essentially constitutes a means or member adapted to be rigidly secured to an object, e.g. the control column, and a further means which connects the device to the first named means or member in such a fashion as to permit the device to move in a line or plane transverse to the axis of rotation of the weight and intersecting the control column.

More particularly, the mounting 32 comprises a ring consisting of a pair of semi-circular flanged halves 34, 36 designed to be located on opposite sides of the control column of an airplane and to clamp the same between them with the aid of a pair of nuts and bolts 38 extending through the flanges. The mounting 32 further comprises a tube 40 including a lower flanged end 41 on which the toroidal casing is seated. The internal diameter of the tube is sufficiently large to permit the same to be slipped quite readily over the tip and down the length of a control column.

A connection between the sleeve and the two-part ring is provided by a pair of leaf springs 42, 44. Each of these is firmly secured at its lower end, as by a rivet 46, to a different one of the halves 34, 36 so that the springs are diametrically opposed. The upper ends of the springs are firmly secured, as by rivets 48, to adjacent the upper end of the tube 40 at diametrically opposite locations. The springs are outwardly bowed so that their upper ends are spaced from the control column.

It now will be seen that when the motor 28 is energized and the eccentric weight 24 rapidly spun about the axis of rotation of the anti-friction bearing, the weight will urge the toroidal casing 16 and tube 40 in one direction in a plane including said axis of rotation and the two springs, and then in an opposite direction, during each 360° of movement of the weight. The springs 42, 44 are sufficiently flexible to permit the tube to be moved a distance sufficient to strike the control column in each direction of movement so that the aforesaid action of movement of the motor 28 creates a series of sharp blows on the control column.

Since the springs are of leaf configuration, they are unable to flex to any noticeable extent in any directions except that mentioned above. Accordingly, the blows imparted upon rotation of the eccentric weight are distinct and separate from one another and cannot be confused with the buffeting that attends flight of an aircraft at high speed.

I have found that the shocks imparted by striking the tube 40 against the control column can be made somewhat crisper, and thereby more distinct, by forming small protuberances 50, i.e. bosses, on the tube 40 at the upper ends of the springs, said bosses acting as hammers to localize the areas of impact.

Moreover, it is desirable to protect the control column against direct hammering blows, and to this end I include protective metal plates 52 on both sides of the said column and held fast thereto through the medium of the clamping ring.

The rapping action is quite severe and accordingly I desirably provide means to captively secure the toroidal casing to the tube 40. Such means conveniently constitutes a group of set screws 53, the tips of which extend through the inner surface of the toroidal casing and bear against the outside of the tube.

Electrical energy is supplied to the motor 28 from any suitable source of electrical power as, for example, a battery 54, the electricity being led through wires 56, one of which is interrupted by a normally open switch 58 that is controlled by a condition responsive device, that is to say a device which, upon the occurrence of a condition, moves from one position to another. Preferably the condition is one of imminent danger. A particular device of this character is disclosed in my U.S. Patent No. 2,478,967 dated August 16, 1949, which shows, claims and describes a mechanism that, upon the assumption of an attitude immediately preceding stall, closes an electrical switch.

In Figs. 5 and 7 I have shown an aircraft alarm 60 embodying a modified form of my invention in which only a single spring is used and further in which the alarm is disposed alongside a control column rather than concentrically thereof. This type of arrangement is of certain advantage where an alarm of the coaxial type, such as the alarm 12, cannot be slipped over the control column due to irregularities of said column or protuberances extending therefrom.

The alarm 60 constitutes a casing 62 in which a miniature electrical motor 64 is disposed. The output shaft 66 of said motor has secured thereto a pinion 68 that meshes with a gear 70 on a jack shaft 72. The shaft 72 is suitably journalled between the upper end of the motor casing 62 and a partition 74 within a head casing 76 integral with the motor casing. The jack shaft carries a pinion 74 meshing with a gear 76 fast on a shaft 78.

Thus rotation of the motor causes the shaft 78 to spin. The train constituting the gears and pinions 68, 70, 72 and 76 serves the dual purpose of slowing down the speed of the shaft 78 and of enabling it to be located concentrically of the electric motor 64 whereby to provide a more attractive appearance and compact arrangement.

An eccentric weight is pinned or otherwise held fast to the shaft 78, the head casing 76 providing sufficient space for movement thereof.

A bracket 82 extending from the side of the motor casing 62 secures said casing to an intermediate portion of a leaf spring 84, the bottom of which is permanently and firmly attached as by a rivet 86 to a two-part clamp 88 fastened to a control column 90.

One of the halves of the clamp includes an integral upstanding arm 92, the upper end of which is provided with a curved finger 94 extending back toward the head casing 76. The finger is slotted to admit the upper end of the leaf spring 84. Preferably this end is provided with tiny blocks on opposite sides thereof to act as hammers for striking the opposite sides of the slot.

It will be appreciated that when the motor 64 is energized, the eccentric weight 80 will rapidly spin and cause the free upper end of the spring 84 to vibrate in a plane including the longitudinal axis of said spring. Inasmuch as the spring, being a leaf spring, is flexible in said plane and stiff perpendicular thereto, the spring will move only in a direction perpendicular to the axis of rotation of the weight, and its upper end thereby will alternately strike first one side and then the other of the slot in the finger to create the desired distinct blows.

The mounting mechanism for securing the rotating eccentric weight to another object, e.g. a control column, in a manner such as to permit movement relative to the column only in a plane parallel to the axis of rotation of the weight and in a direction transverse to said axis, is not necessarily restricted to a one or plural spring mounting devices such as has been described above. Essentially said spring or springs, by a hinging action, simply define a single plane of movement and limit the relative direction of movement in said plane. The same effect can be secured by other equivalent mounting structures. For example, the mounting means may constitute a slide secured to the control column for receiving and guiding a shaker so as to limit relative movement thereof to the desired direction. Another mode of mounting is illustrated in Fig. 8. This consists essentially in providing a pivotal mounting for the shaker with the pivot secured to the control column whereby the shaker only can oscillate with respect to the column in order to secure the requisite repetitive sharp blows.

More particularly in Fig. 8 I have shown a shaker 100 which is identical to the one illustrated in Figs. 1 and 2 except for the mounting means, a different mounting mechanism being employed in alarm of Fig. 8. Specifically the mounting means constitutes a rod 102 which extends through a control column 104 and has a protruding end section. The bottom of the motor casing 30 is secured in a shallow cup 106 from which a pair of ears 108 extend. Said ears are apertured for rotatable mounting on the end sections of the rod 102.

The toroidal casing 16 is slipped on the column, the inner diameter of the sleeve 14 being somewhat in excess of the external diameter of the column in the operative position of the alarm. Thus the toroidal casing is able to experience movement relative to the control column in a plane perpendicular thereto. However, this movement is restricted by the pivotal cooperation between the ears 108 and the rod 102 to a direction perpendicular to the longitudinal axis of the rod 102. Hence the requisite restriction of movement of the toroidal casing is obtained. When the motor in the casing 30 is actuated, the toroidal casing will, in effect, rattle back and forth relative to the control column in a direction perpendicular to the plane of the drawings as the eccentric weight within the toroidal casing spins.

It thus will be seen that I have provided aircraft alarms which achieve all the objects of my invention and are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having described my invention, I claim as new and desire to secure by Letters Patent:

1. An aircraft alarm adapted to be secured to an inanimate object in an airplane for tactilely sensing a signal, said alarm comprising a weight, means mounting said weight for rotation about an axis spaced from the center of gravity of the weight, means to spin said weight rapidly about said axis so as to create a shaking action, and means for securing said mounting means to said object for limited movement relative to said object in a direction generally transverse to said axis of rotation between limits defined by abutment of said mounting means and said object so as to partially convert said shaking action into a series of sharp raps that are distinguishable from buffeting.

2. An aircraft alarm as set forth in claim 1, wherein the mounting means includes an annulus whereby the alarm is adapted to be mounted around a control column of an aircraft.

3. An aircraft alarm as set forth in claim 1, wherein the means securing the mounting means to the object is a pivot.

4. An aircraft alarm as set forth in claim 1, wherein the means securing the mounting means to the object is a leaf spring.

5. An aircraft alarm as set forth in claim 1, wherein the means securing the mounting means to the object is a pair of leaf springs.

References Cited in the file of this patent

UNITED STATES PATENTS

| | | |
|---|---|---|
| 1,052,285 | Schwab | Feb. 4, 1913 |
| 2,128,250 | Howard | Aug. 30, 1938 |
| 2,566,409 | Greene | Sept. 4, 1951 |

FOREIGN PATENTS

| | | |
|---|---|---|
| 447,222 | Great Britain | May 14, 1936 |
| 702,173 | Great Britain | Jan. 13, 1954 |
| 755,014 | Great Britain | Aug. 15, 1956 |